3,666,534
METHOD OF MANUFACTURING GLASS ARTICLES
HAVING A HEAT-REFLECTING FILM
Rolf Groth, Aachen, Germany, and Henricus Johannes
Joseph Van Boort and Gerard Marie Jules De Neve,
Emmasingel, Eindhoven, Netherlands, assignors to U.S.
Philips Corporation, New York, N.Y.
No Drawing. Filed Apr. 13, 1970, Ser. No. 28,137
Int. Cl. B44d 1/48, 1/08
U.S. Cl. 117—97                                                     8 Claims

ABSTRACT OF THE DISCLOSURE

The invention relates to the manufacture of a glass envelope for a sodium vapour discharge lamp which envelope is provided with a film of doped indium oxide.

To obtain an envelope having both few internal mechanical tensions and a great heat reflectivity, the envelope is heated for 5 to 15 minutes at a given temperature after it has been provided with the indium oxide film, during which heat treatment the indium oxide film is contacted with a gas mixture comprising a very small percentage of oxygen.

---

The invention relates to a method of manufacturing a glass article which has a transparent heat-reflecting film consisting of doped indium oxide. Furthermore the invention relates to an article, particularly the glass envelope of a sodium vapour discharge lamp, which is manufactured by such a method and to a sodium vapour discharge lamp having such an envelope.

Glass articles which are transparent and satisfactorily reflect heat radiation are desired for many purposes. Examples are: window panes, hothouse panes and envelopes for sodium vapour discharge lamps. Ordinary glasses only satisfy the above imposed requirement of a satisfactory heat reflection to a slight extent. The heat reflection may be considerably enhanced without much reducing the light transmissivity by providing a thin film of doped indium oxide on the glass surface. Glass articles treated in this manner such as envelopes of sodium vapour discharge lamps have already been known and are described, for example, in "Philips Technical Review" volume 29, 1968, No. 1, pages 17 and 18. The doping of the indium oxide which is necessary for obtaining the satisfactory heat reflection can be effected, for example, with the aid of tin or fluorine. Due to this doping the conductivity of the indium oxide is greatly increased which results in a satisfactory heat reflection. Such films whose thickness is generally between 0.2 and 0.5 micron reflect heat radiation very satisfactorily at a wavelength of more than approximately 3 microns and they absorb little light.

The above-mentioned indium oxide films are generally provided by heating the glass article, for example, the envelope for a sodium vapour discharge lamp or a glass tube from which such an envelope is made at a temperature of from 400° to 600° C. and by atomizing a mixture of indium chloride, a compound of the donor, for example, tin chloride and an organic solvent such as, for example, butylacetate onto the heated glass surface. The desired film of doped indium oxide is then formed on the hot glass surface. The composition and the quantity of atomized material is of course chosen to be such that the desired thickness and reflection of the indium oxide film is obtained.

If glass articles have been heated at a high temperature for performing some operation and are subsequently cooled quickly, tensions are produced in the glass which may give rise to difficulties upon further processing or use of the glass articles, for example, bursting of the glass. It is therefore common practice to anneal glass articles by slowly cooling them after they have been treated at a high temperature. It is then generally not necessary to continue this cooling down to room temperature; in many cases a slow cooling down to a temperature which is still considerably higher than room temperature may suffice. Subsequently further coolnig down to room temperature can then take place quickly.

The annealing operation may, for example, immediately succeed the heating process. However, it is alternatively possible to perform annealing as a separated operation at a later stage.

As described above it is necessary to heat the glass article at a temperature of between 400 and 600° C. for providing a doped indium oxide film on the article. Subsequently it is generally necessary to anneal the article. When annealing is carried out in air for convenience sake the peculiar difficulty occurs that during the slow cooling the electric conductivity of the film decreases so that also the heat reflectivity decreases. This decrease may amount to 12% of the original value.

In the first place it has been found from extensive experiments which have led to the present invention that the decrease of the electric conductivity and hence of the heat reflectivity during annealing in air is due to the high oxygen content thereof and secondly, heating in an atmosphere which is poor in oxygen under certain conditions yields articles which have the desired high conductivity and reflectivity.

According to the invention a method of manufacturing a glass article which has a transparent heat-reflecting film consisting of doped indium oxide is therefore characterized in that after it has been provided with a film of doped indium oxide the glass article is heated at a temperature of more than 300° C. and less than the softening point of the glass for 5 to 15 minutes in a gas atmosphere which comprises from $10^{-2}$ to $10^{-4}$ volume percent of oxygen.

The heating treatment mentioned above may also serve to anneal the article or at least form part of the annealing process. The heat treatment may alternatively be a post-treatment, for it has been found that a reduction of the conductivity and heat reflectivity caused by, for example, annealing in air is offset again.

It is to be noted that fast cooling in air after the film of doped indium oxide has been provided does not result in substantially any reduction of the conductivity and heat reflectivity. However, as is known, inadmissible tensions in the glass often arise due to fast cooling. These tensions may be released later on when suitably using a method according to the invention when a change of the conductivity and heat reflectivity does not occur.

If the oxygen content of the gas atmosphere in which the (post)-heat treatment is carried out is more than $10^{-2}$ volume percent, the envisaged high heat reflectivity is not obtained. If the oxygen content is less than $10^{-4}$ volume percent there is the risk of the indium oxide film being coloured and hence having a lower transmissivity for light. The oxygen content of the gas atmosphere in which (post)-heat treatment is carried out is preferably chosen to be between $2 \times 10^{-3}$ and $10^{-4}$ volume percent because then the desired heat reflectivity is achieved quickly.

The gas atmosphere may consist of, for example, exclusively a mixture of a rare gas and oxygen or a mixture of nitrogen and oxygen; in practice the heat treatment is preferably carried out in mixed gas (for example, of the composition of approximately 92 volume percent of nitrogen and approximately 8 volume percent of hydrogen) which comprises $10^{-2}$ to $10^{-4}$ volume percent of oxygen, for these gas atmospheres are chemically neutral (apart from the influence of the oxygen) relative to the indium oxide film and the glass.

When using mixed gas the composition of the gas which is supplied may have an oxygen content under certain circumstances which content deviates from the above-mentioned required oxygen content. In fact, in the heating zone the gas composition may slightly change due to reactions in that zone. The composition of the mixed gas to be supplied is then determined experimentally by determining the obtained conductivity or heat reflectivity of the glass article coated with indium oxide and comparing these values with those which are obtained when using a gas mixture the composition of which is invariable, for example, rare gas and oxygen and wherein the oxygen content is between $10^{-2}$ and $10^{-4}$ volume percent.

The invention will further be described with reference to the following examples relating to the manufacture of a glass envelope having an internal film of doped indium oxide as is used for the manufacture of the envelope for a sodium vapour discharge lamp.

EXAMPLE I

The starting material was a glass tube of 1 m. length an internal diameter of 7 cm. and an external diameter of 7.8 cm. This tube was heated in a furnace at a temperature of approximately 550° C. and an atomizer was introduced into the tube from which atomizer a solution of indium chloride in butylacetate was sprayed onto the heated wall of the tube, which solution comprises 40 grams of indium chloride per litre of butylacetate and approximately 2.3 atom percent of tin chloride (calculated relative to the number of gram atoms of indium). An extremely thin film of indium oxide doped with tin and having a resistance per square of between 77 and 10 ohms was then formed on the wall of the tube. After this film had been provided the glass tube was removed from the furnace and was introduced into a furnace through which a mixture of nitrogen or argon including a content of $10^{-3}$ volume percent of oxygen was passed. The temperature of this furnace was approximately 500° C. immediately after the glass tube had been transferred and was decreased by approximately 20° C. per minute down to a temperature of approximately 300° C. Subsequently the tube may be removed from the furnace and allowed to cool in air down to room temperature. The tube was then substantially free from tension.

It was found that the resistance per square of the indium oxide film in a tube thus treated did not substantially deviate after total cooling from the resistance per square of the film immediately after it had been provided. (The last-mentioned resistance per square may be measured, for example, by rapidly cooling a glass tube directly after the indium oxide film has been provided. It is true that tensions are then caused in the glass, but the conductivity of the film provided does not substantially change thereby as already noted hereinbefore.)

Subsequently an envelope for a sodium vapour discharge lamp may be formed from the glass tube thus treated and coated with a doped indium oxide film. A heat treatment of the tube, which may then be necessary, can be effected in air without the risk of increasing the resistance of the indium oxide film, provided that this heat treatment lasts for only a short period and/or is very local, for example, only at one end for forming a semi-convex base.

EXAMPLE II

A film of doped indium oxide was provided on a tube in the same manner as described in Example I. Subsequently the glass tube was removed from the furnace and was annealed by slow cooling in air as is common practice for normal glass articles. The resistance per square of the indium oxide film was 40 to 60 ohms per square after this annealing in air. Subsequently an envelope for a sodium vapour discharge lamp was formed from the tube glass obtained by providing a semi-convex closure at one end by deforming the wall of the tube. Subsequently the end which was still open was temporarily closed by means of a plug having a gas supply tube and a gas exhaust tube. Subsequently the envelope was heated at a temperature of more than 300° C. and less than the softening point of the glass, for example, at 500° C. and a stream of mixed gas was passed through the envelope at an oxygen content such that the oxygen content at the heated glass surface was between $10^{-2}$ and $10^{-4}$ volume percent. After 5 to 15 minutes the envelope was allowed to cool down to a temperature of less than 300° C. while maintaining the stream of gas. If the temperature has decreased so far, the stream of gas may be discontinued and the envelope may further cool down to room temperature.

The envelope manufactured in accordance with Example I or II may be further processed in conventional manner to form a part of a sodium vapour discharge lamp.

What is claimed is:

1. A method of manufacturing a glass article having a high conductivity transparent film thereon comprising the steps of:

forming a film essentially of indium oxide and a dopant of an element taken from the group of tin and fluorine on the surface of a glass material;

and heating the film-coated glass to a temperature of more than 300° C. and less than the softening point of the glass for 5 to 15 minutes in a gas atmosphere, said gas atmosphere having no more than $10^{-2}$ percent of oxygen by volume.

2. The method of claim 1 also including the step of annealing the film-coated glass in air prior to the heating step.

3. The method of claim 1 wherein the heating step is part of a step of annealing the film-coated glass.

4. The method of claim 1 wherein the gas atmosphere comprises from $10^{-2}$ to $10^{-4}$ percent of oxygen by volume.

5. The method of claim 1 wherein the gas atmosphere comprises from $2 \times 10^{-3}$ to $10^{-4}$ percent of oxygen by volume.

6. The method of claim 1 wherein the gas atmosphere includes mixed inert gases and from $10^{-2}$ to $10^{-4}$ percent oxygen by volume.

7. The method of claim 1 additionally including the step of forming an envelope from said film-coated glass, said film being internal to said envelope, said envelope being particularly adapted for use in manufacturing sodium vapor discharge lamps.

8. A method of manufacturing a glass article having a high conductivity transparent film thereon comprising the steps of:

atomizing a solution of indium chloride containing small percentage of tin chloride in butylacetate onto a heated glass surface to form a thin film of indium oxide containing a tin dopant;

and heating the film coated glass to a temperature of more than 300° C. and less than the softening point of the glass for 5 to 15 minutes in a gas atmosphere, said gas atmosphere having no more than $10^{-2}$ percent oxygen by volume.

References Cited

UNITED STATES PATENTS

| 3,400,288 | 9/1968 | Groth | 117—33.3 X |
| 3,411,947 | 11/1968 | Block et al. | 117—215 |
| 3,221,198 | 11/1965 | Van Der Wal et al. | 313—113 X |

EDWARD G. WHITBY, Primary Examiner

U.S. Cl. X.R.

65—60; 117—33.3, 64 R, 104 R, 124 B, 169 R; 313—112